(No Model.)
T. S. CRANE.
Lead and Crayon Holder.
No. 240,097.          Patented April 12, 1881.
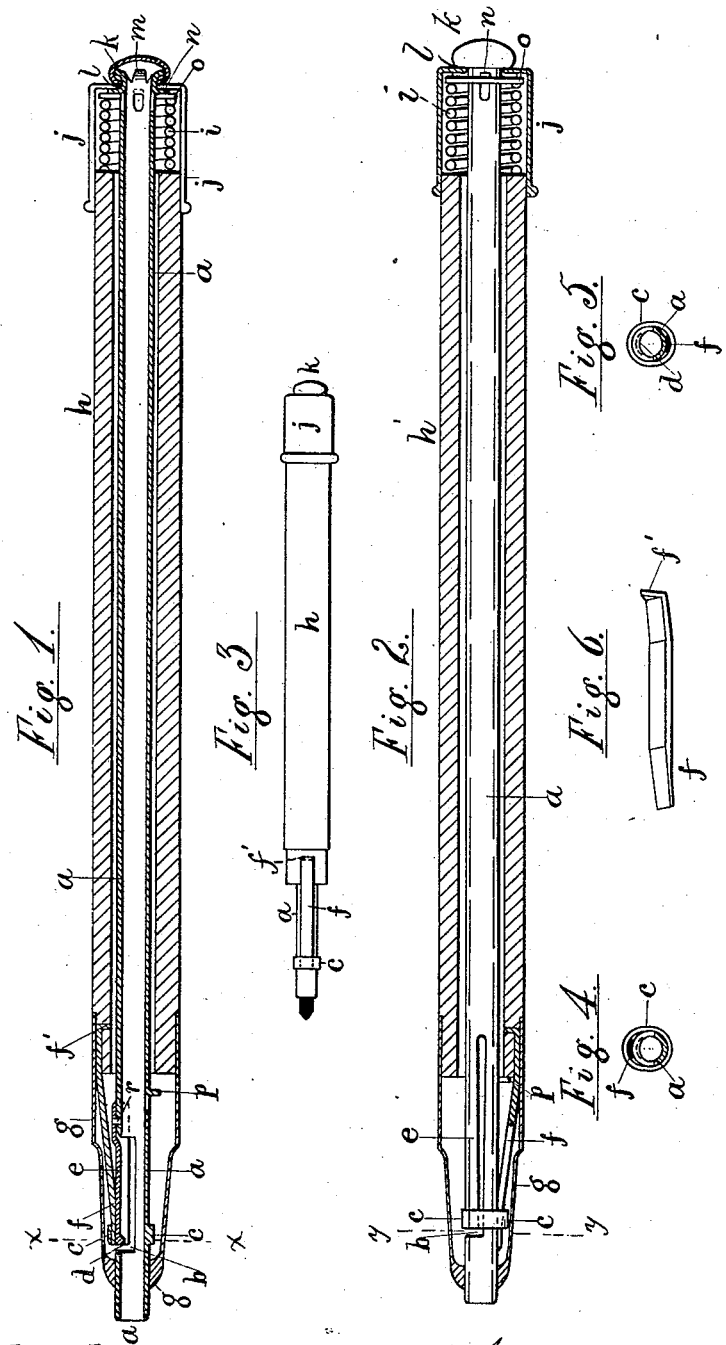
Attest:
Wm Dietz
L. Madans
Inventor.
Thos. S. Crane.

UNITED STATES PATENT OFFICE.

THOMAS S. CRANE, OF NEWARK, NEW JERSEY.

LEAD AND CRAYON HOLDER.

SPECIFICATION forming part of Letters Patent No. 240,097, dated April 12, 1881.

Application filed December 27, 1880. (No model.)

*To all whom it may concern:*

Be it known that I, THOS. S. CRANE, a citizen of the United States, residing in the city of Newark, county of Essex, and State of New Jersey, have invented certain new and useful Improvements in Lead and Crayon Holders, fully described and represented in the following specification and the accompanying drawings, forming a part of the same.

My invention relates to an improvement in lead and crayon holders; and it consists in the combination of a collar and a wedge with a dog applied to an aperture in the side of the lead-tube near the point.

The construction and operation of my device will be understood by reference to the annexed drawings, in which—

Figure 1 is a longitudinal section through the center of a holder containing my invention. Fig. 2 is a similar view so far as relates to all the external coverings but the lead-tube. Its top knob and its operating collar and wedge are not in section, and the arrangement of the wedge and collar are slightly different from that shown in Fig. 1. Fig. 3 is an external view of the holder shown in Fig. 2, with the nozzle removed to show the arrangement of the wedge as it is inserted in the wood of the handle. Fig. 4 is a section of the lead-tube on line $xx$ in Fig. 1; Fig. 5, a similar section on line $yy$, Fig. 2; and Fig. 6, a perspective view of the wedge detached.

The holder belongs to that class in which the lead is automatically clamped, and in which it is released at pleasure by the user and thrown out of the handle or tube by simply tipping the point downward.

The clamping device consists, in this invention, of a single holding-dog arranged to press upon one side of the lead, an aperture being formed in the lead-tube near the point to admit the dog or that part of it which acts upon the lead. The tooth of the dog may be shaped in any suitable manner, and is shown in the drawings as an arched ridge, and the dog is preferably mounted upon the lead-tube, as shown in the drawings, by forming it at the end of an elastic tongue secured to the lead-tube near the aperture.

The device for operating the dog consists of a collar embracing the lead-tube and dog and a wedge thrust between the collar and the tube or dog, the wedge being inserted upon the opposite side from the dog in one form shown and upon the same side of the tube in the other form shown. When either the tube or wedge is moved in relation to the other so as to force the wedge inside the collar the dog is pressed inward and the contained lead powerfully clamped. When moved in the opposite direction the pressure of the wedge is removed, and the elasticity of the tongue carrying the dog moves the latter out of the aperture in the lead-tube, and the lead can then be freely moved and adjusted as desired.

In Fig. 1 the wedge is shown applied between the collar and the dog, and withdrawn from the collar sufficiently to leave the dog unclamped.

In Fig. 2 the wedge is shown inserted between the tube and the collar, the latter being, therefore, fastened to the dog and moving laterally with it, and the letters of reference refer to the same parts in both views. The handle is shown made of wood, and the operating-wedge secured to it by a bent tenon inserted in a mortise.

$a$ is the lead-tube; $b$, the aperture in its side; $c$, the collar; $d$, the dog; $e$, the elastic tongue; $f$, the wedge; $g$, a nozzle or cover for the operating mechanism, and secured upon the end of the wooden tubular handle $h$, which is terminated near the butt of the wedge.

The inside of the wedge is shown in a perspective view in Fig. 6, $f'$ being a bent end or tenon formed upon the butt of the same to secure it in the wood of the handle. When the tenon is thus inserted in a suitable hole in the side of the handle the cover $g$ keeps it secured in its place, although the cover has no function in the operation of the pencil or holder. The wedge being thus made stationary, the lead-tube is arranged to move lengthwise of the handle, the bore of the wood affording perfect freedom to the tube, which is provided with a spring, $i$, and socket $j$ at the upper end, for drawing the tube and collar toward the wedge automatically. The spring is inserted between the upper end of the wooden handle and a stop, $n$, upon the lead-tube, the latter being extended beyond the stop and inserted into and through a hole, $l$, in the spring-socket, which is merely a metallic shell employed to cover the spring and upper end of the handle as the cover $g$ does the wedge and collar. When extended through the top of the socket the upper end of the lead-tube is bent or clinched around the hole $l$, and the socket is thus retained in place upon the lead-tube by the stop $n$ and the clinched part $m$, and is free to turn without turning the lead-tube and displacing it in relation to the wedge. Pressure upon the end of the lead-tube compresses the spring, as shown in Fig. 1, and releases the lead in the holder from the pressure of the dog $d$.

To ornament the upper end of the lead-tube and receive the pressure of the finger, a knob, $k$, may be secured upon the top of the tube, when it is clinched.

To free the socket $j$ entirely from the tension of the spring, a washer, $o$, may be inserted beneath the stop $n$, and another stop, $p$, may be applied to the lead-tube inside the cover $g$, to prevent the wedge from compressing the elastic tongue $e$ too much when no lead is in the lead-tube.

The cross-sections of the wedge and collar in Figs. 4 and 5 show how the collar is secured in the one case to the tube, as in Fig. 1, and in the other to the dog, as in Fig. 2. They also show the oval or elongated form required for the collar to adapt it to embrace the tube and yet permit the dog to properly move to accomplish its withdrawal from the tube; and though shown as a continuous band, this collar may have the form of a hook and yet perform its required function.

The elastic tongue is shown in Fig. 1 as formed separate from the lead-tube and riveted thereto at $r$, while in Fig. 2 it is represented as formed from the metal cut out at one side of the tube to form the aperture $b$.

Although best practically, it is not essential that the dog shall be carried by an elastic tongue, as it might be supported by the collar.

The operation of the wedge and collar being understood, it will be obvious that the effect would be the same if the wedge were movable in relation to the handle $h$ and the lead-tube made stationary or integral therewith. In such case the spring would be preferably located inside the cover $g$, and the wedge operated by a slide upon the handle connected to the wedge.

It is also obvious that the spring may be arranged inside the cover $g$ to move the lead-tube toward the wedge, and in such case a plain cap or knob would suffice to receive the desired pressure upon the upper end of the tube.

I do not therefore limit myself to the precise constructions shown and described, but claim my invention whichever way the clamping-dog is operated.

The end of the lead-tube $a$ forward of the dog may be omitted, if desired.

The stops $n$ and $p$ are shown as bent out of the shell of the lead-tube, leaving open slots in the same; but detached stops may be used and secured in place on the lead-tube in any suitable manner.

What I claim is—

1. The combination, with a lead-containing tube embraced by a handle or case, which parts are movable longitudinally with respect to each other, of a holding-dog, as $d$, a collar, as $c$, and a wedge, as $f$, substantially as shown and described.

2. The combination, with the case or holder of a lead or crayon holder, of the following instrumentalities for clamping the lead contained in the lead-tube, viz: a holding-dog carried by an elastic tongue, a collar arranged to embrace the tube and dog, a wedge arranged to penetrate within the collar, and a spring operating to automatically move the wedge and lead-tube longitudinally in relation to each other, substantially as described.

3. The combination of a lead-containing tube, a holding-dog and collar, a handle carrying a wedge adapted to operate within the collar, and a spring inserted between the end of the handle and a stop upon the lead-tube, and operating to move the lead-tube longitudinally with respect to the handle, substantially as shown and described.

4. The means for operating a lead-tube automatically, consisting of the spring $i$, covering shell or socket $j$, and the lead-tube $a$, extended through the hole $l$ in the top of the socket, and provided with a stop, $n$, and clinched end $m$, substantially as shown and described.

5. The construction whereby the socket is adapted to turn loosely upon the lead-tube and the hole in the end of the lead-tube is covered, the same consisting of a stop, $n$, with which the lead-tube is provided, against which stop and the end of the case or holder the spring bears, and the knob $k$, secured to the top of the lead-tube by clinching the latter, all substantially as shown and described.

In testimony whereof I have hereunto set my hand in the presence of two subscribing witnesses.

THOS. S. CRANE.

Witnesses:
H. T. MUNSON,
T. H. PALMER.